United States Patent
Norman et al.

(10) Patent No.: US 6,807,749 B2
(45) Date of Patent: Oct. 26, 2004

(54) DRYING CARBON BLACK PELLETS

(75) Inventors: Don T. Norman, Fredricksburg, TX (US); Robert W. Wansbrough, Houston, TX (US)

(73) Assignee: Continental Carbon Company, Inc., Houston, TX (US)

( * ) Notice: Subject to any disclaimer, the term of this patent is extended or adjusted under 35 U.S.C. 154(b) by 102 days.

(21) Appl. No.: 10/137,536

(22) Filed: May 2, 2002

(65) Prior Publication Data

US 2003/0204967 A1 Nov. 6, 2003

(51) Int. Cl.[7] .................................................. F26B 3/08
(52) U.S. Cl. .......................................... 34/359; 34/478
(58) Field of Search ................................. 110/346, 347; 34/359, 360, 363, 377, 478, 480

(56) References Cited

U.S. PATENT DOCUMENTS

| | | | | | |
|---|---|---|---|---|---|
| 3,989,473 A | * | 11/1976 | Henderson | .................... | 23/314 |
| 4,287,023 A | * | 9/1981 | Cooper | ......................... | 201/31 |
| 4,372,937 A | * | 2/1983 | Johnson | ....................... | 423/453 |
| 4,590,039 A | * | 5/1986 | Cheng | .......................... | 422/150 |

\* cited by examiner

Primary Examiner—Ira S. Lazarus
Assistant Examiner—Camtu Nguyen
(74) Attorney, Agent, or Firm—Cook, Alex, McFarron, Manzo, Cummings & Mehler Ltd.

(57) ABSTRACT

Drying wet carbon black pellets by physically contacting carbon black pellets with warm carbon black smoke.

20 Claims, No Drawings

DRYING CARBON BLACK PELLETS

This invention relates to drying wet carbon black pellets by physically contacting wet carbon black pellets with carbon black smoke.

More particularly this invention relates to a process of producing dry carbon black pellets, which comprises the steps of (1) combusting a hydrocarbon feed to form a combustion product comprising carbon black particles and gaseous products, (2) quenching the combustion product of step (1) to form a carbon black smoke, (3) separating the carbon black smoke stream into at least two streams comprising stream A and stream B, both of which are at least 700° F., (4) conveying carbon black smoke stream A through a main filter at a temperature below the upper operating limit of the filter to separate carbon black particles from by-product off gases, (5) conveying the carbon black particles from step (4) to a pelletizing area, mixing with water and pelletizing to form wet pellets, and (6) contacting the wet pellets of step 5 with stream B, which is at a temperature of at least 700° F., to dry the carbon black pellets.

The typical furnace carbon black process utilizes a standard sequence of process equipment. Raw materials including an oxygen containing gas such as air, a fuel such as natural gas or fuel oil, feedstock oil, and potentially other additives are metered into a reactor where the feedstock oil is thermally converted to carbon black and gaseous by-products.

The reaction is stopped by cooling the reaction mass, typically by the use of water introduced into the reaction to below 2000° F. The resulting smoke stream, which contains carbon particles less than 0.5 microns, is conveyed through a smoke header containing energy saving devices such that the combustion smoke stream enters the air preheater to cool the smoke stream to about 1000° F., oil preheater and possibly, other devices, such as a cooling tower quench, before entering the main filter, usually a bag filter at a temperature below the upper operating limit of the filter, typically about 500° F. The higher the smoke stream temperature, the shorter the life of the main filter.

The main filter separates the primary product carbon black from the by-product off-gases. The carbon black can be any product having nitrogen surface area ranging from 8 $m^2/gm$ to 300 $m^2/gm$, and DBP absorption ranging from 50 cc/100 gm to 200 cc/100 gm. The off-gases that result from the combustion are high in moisture content and have a combustion value wet in the range of 50 BTU/CF to 150 BTU/cf. Sometimes these gases are combusted and the heat used in boilers for producing steam, in carbon black dryers—rotary dryers and fluid bed dryers, and for other purposes. In many plants, the steam produced is used through a turbine/generator set to produce electricity.

Typically, the carbon black is gathered from the main filter and conveyed, using a smoke conveyor or an air conveyor, to a pelletizing area where it is temporarily held in the fluffy and dry form in a tank. From here it is fed to a mixer where water and other pelletizing additives are introduced in measured amounts and mixed with the carbon black. The resulting mixture is mechanically formed into pellets of about 1 millimeter in diameter or $10^4$ times the size of carbon black particles in the smoke. These wet pellets, which contain from 30% to 65% water by weight, are introduced into a dryer, either rotary or fluid bed, where the water is driven off with externally supplied heat. The gas stream containing the vaporized pelletizing water is discharged from the dryer and filtered.

Heat to the dryer for driving off the water from the wet pellets is normally supplied by combusting off-gas, natural gas or some fuel with air in a combustor. Usually this hot gas stream is circulated around the dryer drum and inside a dryer firebox and part or all of the stream is used to carry the released moisture from the dryer to a second filter.

Dried carbon black from the dryer is conveyed to bulk storage tanks using a series of equipment such as elevators, screw conveyors, belts, pneumatic conveyors, vertical or inclined drops, etc. The product normally passes through screens and magnets during the conveying from the dryer to storage. From storage, further conveying is available to reach packaging facilities.

The general object of this invention is to provide a more economical and energy efficient method of producing carbon black. Other objects appear hereafter.

The objects of this invention can be attained by a process which comprises drying wet carbon black pellets by physically contacting wet carbon black pellets with carbon black smoke. The carbon black smoke, which is preferably at a temperature of at least 700° F., is diverted from the carbon black smoke stream upstream of the main carbon black smoke filter, usually a bag filter.

This invention has the advantage that by splitting the quenched combustion product, into two streams upstream of the main filter, (1) less carbon black smoke has to be cooled prior to separation in the filter, (2) no external energy has to be supplied to dry the wet carbon black pellets in the carbon black pellet dryer because split, hot carbon black smoke is contacted with wet carbon black pellets, i.e. sensible heat from the carbon black smoke is substituted for drying energy, (3) certain pieces of equipment can be down sized or omitted, as explained below, with attendant reduced maintenance and (4) reduced use of water.

While Henderson U.S. Pat. No. 3,989,473 discloses a carbon black processing system wherein a relatively small portion of quenched smoke is utilized to facilitate screening of wet pellets prior to being introduced into a dryer, the reference does not teach using the quenched smoke to dry the wet pellets, etc.

In somewhat greater detail this invention comprises the steps of (1) combusting a hydrocarbon feed to form a combustion product comprising carbon black particles and gaseous products, (2) quenching the combustion product of step (1) to form a carbon black smoke, (3) separating the carbon black smoke stream into at least two streams comprising stream A and stream B, both of which are at least 700° F., (5) conveying carbon black smoke stream A through a main (preferably bag) filter at a temperature below the upper operating limit of the filter to separate carbon black particles from by-product off gases, (6) conveying the carbon black particles from step (4) to a pelletizing area, mixing with water and pelletizing to form wet pellets, and (6) contacting the wet pellets of step 5 in a dryer with stream B, which is at a temperature of at least 700° F., to dry the carbon black pellets. Separation of carbon black pellets and the carbon black particles in the smoke is maintained by controlling the minimum smoke velocity in the dryer. Other things being equal, the optimum ratio of stream A to stream B depends on the temperature of stream B but can range from 10:1 to 1:1000. In some cases, there will be no stream A. The higher the temperature of stream B, the lower the smoke volume necessary to dry the wet pellets.

In one aspect, this invention comprises quenching the combustion product to produce a carbon black smoke effluent of about 1200 to 1700° F., cooling the effluent in an air preheater to about 900 to 1100° F., splitting the black smoke stream into streams A and B, conveying stream A through the main filter at a temperature below the upper operating limit for the filter, conveying carbon black particles from the main filter to a pelletizing area, mixing with water and pelletizing to form wet pellets and contacting the wet pellet with stream B, which is at a temperature of at least 700° F., to dry the carbon black pellets. The carbon black smoke effluent from the drier is preferably recycled to the main filter to recover the carbon black but can be filtered separately.

In a second aspect, this invention comprises quenching the combustion product to produce a carbon black smoke effluent of about 1800° F. to 2200° F., cooling the effluent to about 1300 to 1700° F. upstream of the air preheater, splitting the carbon black smoke effluent into stream A and stream B, passing stream A through an air preheater to produce a black smoke effluent of 900 to 1100° F., conveying stream A through the main filter at a temperature below the upper operating limit of the filter, conveying carbon black particles from the main filter to a pelletizing area, mixing with water and pelletizing to form wet pellets and contacting wet pellets with stream B, which is at a temperature of at least 700° F. to dry the carbon black pellets. Preferably, separation of the dried carbon black pellets from the drying stream B is maintained. The stream B is recycled upstream of the air preheater to cool the black smoke effluent from 1800 to 2200° F. to 1300 to 1700° F. This permits further downsizing of the equipment.

In a third aspect, the invention comprises quenching the combustion product to produce a carbon black smoke effluent of about 1800° F. to 2200° F., splitting the black smoke effluent into stream A and stream B, passing stream A through an air preheater to produce a black smoke effluent of 900 to 1100° F., conveying stream A through the main filter at a temperature below the upper operating limit of the filter, conveying carbon black particles from the main filter to a pelletizing area, mixing with water and pelletizing to form wet pellets and contacting wet pellets with uncooled stream B, which is at a temperature of about 1800 to 2200° F. The dried carbon black pellets are separated from the drying gas stream B. Stream B is recycled upstream of the air preheater to cool black smoke effluent stream A from a range of 1800° F. to 2200° F. down to a range of 1300 to 1700° F. This permits further downsizing of equipment from the second aspect.

In a fourth aspect, the invention comprises quenching the combustion product to produce a carbon black smoke effluent of about 1200 to 1700° F. cooling the effluent in an air preheater to about 900 to 1100° F., conveying carbon black smoke stream through the main filter at a temperature below the upper operating limit for the main filter, conveying carbon black particles from the main filter to a pelletizing area, mixing with water and pelletizing to form wet pellets and contacting the wet pellets with substantially all of the carbon black smoke, which is at a temperature above the upper operating limit for the main filter to dry the carbon black pellets before passing the carbon black smoke through the main filter.

In the first aspect, the smoke stream is diverted from the smoke header between the outlet of the combustion air preheater and the inlet to the main filter and while it still is at very high temperature. The diverted smoke stream is routed from this point directly to the carbon black outlet end of a dryer drum or fluid bed dryer. But this can also be the carbon black inlet end of the dryer. Preferentially, the pipe used for moving the smoke stream is efficiently insulated to prevent heat loss. At the dryer, the smoke stream is introduced directly into and through the dryer, passing over and through the carbon black pellets, removing the moisture and drying the pellets. If the drying equipment is a fluid bed dryer, the equipment is stationary and the fluidizing medium is the smoke stream. The dried carbon black usually contains less that 1% by weight water.

Dried carbon black proceeds through standard conveying techniques to standard storage and/or packaging.

The smoke stream is conveyed from the carbon black entrance end of the dryer, or this can be the carbon black outlet end of the dryer, by use of some means such as a fan and is routed back to the main filter inlet. In the main filter, the carbon black and off-gases are separated in a normal fashion. Preferentially, the line conveying the smoke stream from the carbon black pellet dryer to the main filter is efficiently insulated to prevent heat loss. Partial carbon black/flue gas separation, such as a cyclone separator to remove grit prior to the smoke entry to the pellet dryer, can be employed.

In this new drying scheme, there is no longer a need for a dryer combustor, because off-gases, natural gas, or other fuels are no longer burned to provide the heat for drying. There is also no longer a need for a dryer firebox (or the shroud around the dryer) as the smoke stream only passes through the inside of the dryer. There is also no longer a need for a dryer exhaust filter since the main filter now serves this purpose. This eliminates a plant emission source. The dryer is no longer heated externally and preferentially will require insulation. In other words, drying is carried out in the substantial absence of external heat.

Less water is employed to quench the carbon black combustion product and accordingly, total water consumption is reduced. Maintenance costs are less since there is less plant equipment. Dryer drum life is extended because it is not fired as hot and the heat in the drum is more uniform along its entire length.

If burning natural gas or fuel oil or other purchased fuel to supply heat in the dryer is normal, this is no longer required and translates to a direct savings in operating costs. If off-gas is normally burned to supply heat in the dryer, this is no longer required and the off-gas can be diverted for other purposes such as generating steam and/or electricity. Off-gas for drying normally equates to 15% to 20% of the total off-gas generated.

Control of the drying can be achieved by conventional means. Preferentially, the total amount of the smoke stream that is diverted through the dryer is controlled by use of a butterfly valve in the line carrying the smoke from the dryer to a fan on the smoke stream at the outlet of the dryer. The desired split is determined by heat required in the dryer and carbon black bed exit temperature from the dryer. In this aspect, the ratio of stream A to stream B is preferably from about 10:1 to 1:1000. The portion of the smoke stream necessary to provide heat to drive the water from the wet pellets goes through the dryer and the remainder goes directly to the main filter.

A typical dryer heat balance from operation of the smoke drying scheme is shown below. Values are averaged hourly readings taken over an 8-hour shift.

Smoke Stream

Temperature into dryer, ° F. 730

Temperature out of dryer, ° F. 355

Main bag filter inlet temperature, ° F. 450

Carbon Black Bed

Exit Temperature, ° F. 365

Dryer Drum Pressure

Inlet, inches of water −1.7

Outlet, inches of water −2.1

Quality of carbon black produced using the smoke drying scheme is compatible with industry quality standards. To some extent this is surprising, when one considers that the carbon black pellets are dried by direct contact with a hot fluid containing unclassified carbon black particles. Product temperature is easily controlled and moisture content of this finished product is uniformly low for all products produced using the smoke drying scheme. The process is capable of correcting for unit upsets. Post treatment of the pellet stream for fines removal is within the scope of this patent.

Typical product quality from the dryer outlet produced using no binder is shown below. Examples for two grades are shown. Others were similar in pellet quality.

|  | Grade: | |
| --- | --- | --- |
|  | N-339 | N-330 |
| NSA, $m^2/gm$ | 91 | 76 |
| DBP, cc/100 gm | 117 | 105 |
| Moisture, % | 0.3 | 0.6 |
| 5' Fines, % | 3.2 | 1.6 |
| 20" Fines, % | 4.6 | 2.7 |
| Size Distribution, % | | |
| 10 mesh | 1.8 | 1.7 |
| 18 mesh | 27.3 | 44.3 |
| 35 mesh | 44.0 | 38.2 |
| 60 mesh | 21.6 | 12.9 |
| 120 mesh | 3.8 | 1.6 |
| Pan | 1.5 | 1.2 |
| Crushing Strength average, gms | 23 | 28 |

In the second aspect, the smoke stream is diverted prior to the air preheater between the outlet of the primary reactor and air preheater. The diverted smoke stream is cooled to about 1300 to 1700° F. preferably with gas effluent from the wet carbon pellet dryer and then conveyed to the wet pellet dryer as in aspect 1. In this aspect, the ratio of stream A to stream B is preferably from 2:1 to 1:10.

The process of aspect 2 has all the advantages of the process of aspect 1. Since the smoke stream used to dry wet carbon black pellets in aspect 2 is at 1300 to 1700° F. vs. 900 to 1100° F., aspect 2 requires only ⅔ to ⅘ the volume of smoke stream in aspect 1 to drive off water from the wet pellets.

Thus for a new unit, the wet pellet dryer can be smaller.

The summary table provides model generated data all with reactor prequench temperatures assumed to be 2400 deg. F, while producing N339 with 1000 MSCFH air at 1200 deg. F preheat. Each column represents a case with different conditions as indicated. The first case is the aspect 1 prediction for comparison purposes. The next 3 recycle cases are at 1400, 1450, and 1600 deg. F quench T to the air preheater and dryer drum, with 90% dryer drum thermal efficiency. Dashes in this Table and the Tables below mean same value as at left.

| SUMMARY | | | | | | | |
| --- | --- | --- | --- | --- | --- | --- | --- |
| | ASPECT | | | | | | |
| | 1 | 2 | | | 2 | | |
| Prequench T, ° F. | 2400 | — | — | — | — | — | — |
| Primary Quench T, ° F. | 1400 | 1912 | 1977 | 2173 | 1870 | 1934 | 2126 |
| Air total MSCFH | 1000 | — | — | — | — | — | — |
| Preheater inlet T, ° F. | 1400 | 1400 | 1450 | 1600 | 1400 | 1450 | 1600 |
| Dryer cb wt % water | 50% | — | — | — | — | — | — |
| Wet black T into dryer | 150 | — | — | — | — | — | — |
| Dry black T out of dryer | 350 | — | — | — | — | — | — |
| Smoke T out of dryer, ° F. | 400 | — | — | — | — | — | — |
| Dryer thermal efficiency | 90% | — | — | — | 100% | — | — |
| NG MSCFH to cb reactor | 74.6 | — | — | — | — | — | — |
| Production #/hr. | 11493 | — | — | — | — | — | — |
| Air Preheater smoke T out, ° F. | 976 | 969 | 1015 | 1151 | 974 | 1020 | 1156 |
| Waste gas bag filter volume, MSCFH | 2220 | 2166 | 2156 | 2125 | 2191 | 2182 | 2150 |
| MSCFH to dryer drum | 1177 | 904 | 871 | 787 | 838 | 808 | 733 |

-continued

SUMMARY

| | ASPECT | | | | | | |
|---|---|---|---|---|---|---|---|
| | 1 | 2 | | | 2 | | |
| fraction of this to Aspect 1 | 1.000 | 0.736 | 0.708 | 0.641 | 0.682 | 0.657 | 0.596 |
| % water into dryer drum | 34.1% | 33.1% | 32.0% | 28.8% | 33.8% | 32.7% | 29.5% |
| Wet Waste Gas net heating value, BTU/scf | 60.4 | 63.9 | 64.2 | 65.1 | 63.1 | 63.4 | 64.4 |
| Primary quench gpm | 44.6 | 18.9 | 16.1 | 8.2 | 20.8 | 18.0 | 10.0 |
| Cooling tower quench gpm | 7.4 | 28.0 | 29.9 | 34.8 | 29 | 30 | 35 |
| Pelletizing water added gpm | 23.0 | 23.0 | 23.0 | 23.0 | 23.0 | 23.0 | 23.0 |
| Total quench and dryer water gpm | 75.0 | 69.9 | 69.0 | 66.0 | 72.3 | 71.4 | 68.4 |
| Waste Gas $CO_2$ MSCFH | 47 | — | — | — | — | — | — |
| CO | 152 | — | — | — | — | — | — |
| $C_2H_2$ | 11.4 | — | — | — | — | — | — |
| $CH_4$ | 4.5 | — | — | — | — | — | — |
| $H_2$ | 253 | — | — | — | — | — | — |
| $H_2O$ | 967 | 914 | 904 | 873 | 939 | 929 | 898 |
| $N_2$ | 785 | — | — | — | — | — | — |
| TOTAL MSCFH | 2220 | 2166 | 2156 | 2125 | 2191 | 2182 | 2150 |

The last three cases are at 100% thermal dryer drum efficiency, indicating the benefit of making the heat losses negligible. The ratio of stream A to stream B in these runs ranged from about 2:3 to 1:6.

The process of aspect 3 has all the advantages of the process of aspect 2. Since the smoke stream used to dry the wet carbon pellets in aspect 3 is at 1800° F. to 2200° F., aspect 3 only requires 70% of the volume of smoke stream in aspect 2 to drive off water from the wet pellets. In this aspect, the ratio of stream A to stream B is preferably 4:1 to 1:10.

The summary table provides model generated data all with reactor prequench temperature of 2400° F., while producing N339 with 1000 MSCFH air at 1200° F. air preheat. The first case is the aspect 1 prediction for comparison purposes.

SUMMARY

| | ASPECT | | | | | | |
|---|---|---|---|---|---|---|---|
| | 1 | 3 | | | 3 | | |
| Prequench T, ° F. | 2400 | — | — | — | — | — | — |
| Primary Quench T, ° F. | 1400 | 1912 | 1977 | 2173 | 1870 | 1934 | 2126 |
| Air total MSCFH | 1000 | — | — | — | — | — | — |
| Preheater Inlet *T, ° F. | 1400 | 1400 | 1450 | 1600 | 1400 | 1450 | 1600 |
| Dryer cb wt % water | 50% | — | — | — | — | — | — |
| Wet black T into dryer | 150 | — | — | — | — | — | — |
| Dry black T out of dryer | 350 | — | — | — | — | — | — |
| Smoke T out of dryer | 400 | — | — | — | — | — | — |
| Dryer thermal efficiency | 90% | — | — | — | 100% | — | — |
| $O_2$ MSCFH to cb reactor | 0.0 | — | — | — | — | — | — |
| NG MSCFH to cb reactor | 74.6 | — | — | — | — | — | — |
| Production #/hr. | 11493 | — | — | — | — | — | — |
| Air Preheater smoke T out, ° F. | 976 | 969 | 1015 | 1151 | 974 | 1020 | 1156 |
| Waste Gas Bag Filter Volume, MSCFH | 2220 | 2166 | 2156 | 2125 | 2191 | 2182 | 2150 |
| MSCFH to dryer drum | 1177 | 668 | 649 | 601 | 637 | 620 | 574 |
| fraction of this to Aspect 1 | 1.000 | 0.543 | 0.528 | 0.489 | 0.518 | 0.504 | 0.467 |
| % water into dryer drum | 34.1% | 33.1% | 32.0% | 28.8% | 33.8% | 32.7% | 29.5% |
| Wet Waste Gas net heating value, BTU/scf | 60.4 | 63.9 | 64.2 | 65.1 | 63.1 | 63.4 | 64.4 |
| Primary quench gpm | 44.6 | 18.9 | 16.1 | 8.2 | 20.8 | 18.0 | 10.0 |
| Cooling tower quench gpm | 7.4 | 28.0 | 29.9 | 34.8 | 29 | 30 | 35 |
| Pelletizing water added Gpm | 23.0 | 23.0 | 23.0 | 23.0 | 23.0 | 23.0 | 23.0 |
| Total quench and dryer water gpm | 75.0 | 69.9 | 69.0 | 66.0 | 72.3 | 71.4 | 68.4 |

-continued

SUMMARY

| | ASPECT | | | | | | |
|---|---|---|---|---|---|---|---|
| | 1 | 3 | | | 3 | | |
| Waste Gas CO2 MSCFH | 47 | — | — | — | — | — | — |
| CO | 152 | — | — | — | — | — | — |
| C2H2 | 11.4 | — | — | — | — | — | — |
| CH4 | 4.5 | — | — | — | — | — | — |
| H2 | 253 | — | — | — | — | — | — |
| H2O | 967 | 914 | 904 | 873 | 939 | 929 | 898 |
| N2 | 785 | — | — | — | — | — | — |
| TOTAL MSCFH | 2220 | 2166 | 2156 | 2125 | 2191 | 2182 | 2150 |

The ratio of stream A to stream B in these runs ranged from about 2:3 to 1:6.

From an apparatus point of view, this invention comprises combusting a hydrocarbon feed to form a combustion product comprising carbon black particles and gaseous products in a carbon black furnace, quenching the combustion product to form a carbon black smoke, cooling at least part of the carbon black smoke in heat exchange zones comprising first an air preheater and then an oil preheater, conveying cooled carbon black smoke through a main filter to separate carbon black particles from by-product off gases, conveying carbon black particles to a pelletizing area, mixing with water and pelletizing to form wet carbon black pellets physically contacting wet carbon black pellets in a pellet dryer with carbon black smoke diverted from the process upstream of the main filter. As explained above, the carbon black smoke used to dry the wet pellets can be diverted from the carbon black smoke stream between the carbon black quench and the air preheater or between the oil preheater and main filter and it can be returned to the process at any suitable position upstream of the main filter or can be filtered separately.

We claim:

1. The process of producing dry carbon black pellets through the utilization of carbon black smoke as a drying medium which comprises supplying wet carbon black pellets produced in a carbon black pelletizing area to a carbon black wet pellet dryer, simultaneously supplying carbon black smoke to said carbon black wet pellet dryer, and physically contacting said wet carbon black pellets with said carbon black smoke in said carbon black wet pellet dryer.

2. The process of claim 1, wherein the carbon black smoke is at least 700° F.

3. The process of claim 1, wherein the wet carbon black pellets are dried substantially in the absence of external heat.

4. The process of producing dry carbon black pellets, which comprises the steps of (1) combusting a hydrocarbon feed to form a combustion product comprising carbon black particles and gaseous products, (2) quenching the combustion product of step (1) to form a carbon black smoke, (3) separating the carbon black smoke stream into at least two streams comprising stream A and stream B, both of which are at least 700° F., (4) conveying carbon black smoke stream A through a main filter at a temperature below the upper operating limit of the filter to separate carbon black particles from by-product off gases, (5) conveying the carbon black particles from step (4) to a pelletizing area, mixing with water and pelletizing to form wet carbon black pellets, (6) supplying said wet carbon black pellets to a carbon black wet pellet dryer, (7) simultaneously supplying said carbon black smoke stream B to said dryer and (8) contacting the wet pellets of step 5 with said stream B, which is at a temperature of at least 700° F. to dry the carbon black pellets whereby, said carbon black pellets are dried through the utilization of carbon black smoke as a drying medium to produce a carbon black product which is compatible with industry quality standards for carbon black products produced by conventional dryers utilizing externally supplied heat.

5. The process of claim 4, wherein the wet carbon black pellets are dried substantially in the absence of external heat.

6. The process of claim 4, wherein the ratio of stream A to Stream B is from 10:1 to 1:1000.

7. The process of claim 4, wherein the combustion product is quenched to produce a carbon black smoke effluent of about 1300 to 1500° F., cooled in an air preheater to about 900 to 1100° F. and split into streams A and B.

8. The process of claim 7, wherein carbon black smoke effluent from the wet carbon pellet dryer is recycled to the main carbon black smoke filter.

9. The process of claim 4, wherein the combustion product is quenched to produce a carbon black smoke effluent of about 1800 to 2200° F. and split into streams A and B upstream of the air preheater.

10. The process of claim 9, wherein carbon black smoke effluent from the wet carbon pellet dryer is recycled upstream of the air preheater to cool the quenched black smoke effluent.

11. The process of producing dry carbon black pellets, which comprises combusting a hydrocarbon feed to form a combustion product comprising carbon black particles and gaseous products, quenching the combustion product to produce a carbon black smoke effluent of about 1200 to 1700° F., cooling the effluent in an air preheater to about 900 to 1100° F., splitting the black smoke stream into streams A and B, cooling stream A to a suitable temperature for filtering in the main filter, conveying carbon black particles from the main filter to a pelletizing area, mixing with water and pelletizing to form wet carbon black pellets, supplying said wet carbon black pellets to a carbon black wet pellet dryer, simultaneously supplying said carbon black smoke stream B to said carbon black wet pellet dryer, and contacting wet pellets in said dryer with said stream B, which is at a temperature of at least 700° F., to dry the carbon black pellets whereby, said carbon black pellets are dried through the utilization of carbon black smoke as a drying medium to produce a carbon black product which is compatible with industry standards for carbon black products produced by conventional drying processes wherein externally supplied heat is used as the drying medium.

12. The process of claim 11, wherein carbon black smoke effluent from the wet carbon pellet dryer is recycled to the main carbon black smoke filter.

13. The process of producing dry carbon black pellets, which comprise combusting a hydrocarbon feed to form a combustion product comprising carbon black particles and gaseous products, quenching the combustion product to produce a carbon black smoke effluent of about 1800° F. to 2200° F., splitting the black smoke effluent into stream A and stream B upstream of the air preheater, passing stream A through an air preheater to produce a black smoke effluent of 900 to 1100° F., cooling stream A to a suitable temperature for filtering in the main filter, conveying carbon black particles from the main filter to a pelletizing area, mixing with water and pelletizing to form wet pellets, and contacting wet carbon black pellets in a carbon black wet pellet dryer with stream B, which is at a temperature of at least 700° F., to dry the carbon black pellets, whereby said carbon black pellets are dried through the utilization of carbon black smoke as a drying medium to produce a carbon black product which is compatible with industry standards for carbon black products produced by conventional drying process wherein externally supplied heat is used as the drying medium.

14. The process of claim 13, wherein the quenched carbon black smoke effluent of about 1800 to 2200° F., is cooled to about 1300 to 1700° F. upstream of the air preheater and split into streams A and B upstream of the air preheater.

15. The process of claim 14, wherein carbon black smoke effluent from the wet carbon pellet dryer is recycled upstream of the air preheater to cool the quenched black smoke effluent to about 1300° F. and 1700° F.

16. The process of claim 13, wherein the quenched combustion product at a temperature of 1800° F. to 2200° F. is contacted with the wet carbon pellets.

17. The process of claim 16, wherein carbon black smoke effluent from the wet carbon pellet dryer is recycled upstream of the air preheater to cool the quenched black effluent to about 1300° F. and 1700° F.

18. The process of producing dry carbon black pellets, which comprises the steps of (1) combusting a hydrocarbon feed to form a combustion product comprising carbon black particles and gaseous products, (2) quenching the combustion product of step (1) to form a carbon black smoke, (3) separating the carbon black smoke stream into at least two streams comprising stream A and stream B, both of which are at least 700° F., (4) conveying carbon black smoke stream A through a main filter at a temperature below the upper operating limit of the filter to separate carbon black particles from by-product off gases, (5) conveying the carbon black particles from step (4) to a pelletizing area, mixing with water and pelletizing to form wet pellets, and (6) contacting the wet pellets of step 5 with stream B, which is a temperature of at least 700° F. to dry the carbon black pellets, wherein the ratio of stream A to stream B is from 10:1 to 1:1000.

19. The process of claim 18 wherein the wet carbon black pellets are dried substantially in the absence of external heat.

20. The process of claim 18, wherein the combustion product is quenched to produce a carbon black smoke effluent of about 1300 to 1500° F., cooled in an air preheater to about 900 to 1100° F. and split into streams A and B.

* * * * *